United States Patent [19]

Bauer

[11] Patent Number: 5,170,424
[45] Date of Patent: Dec. 8, 1992

[54] X-RAY FILM CASSETTE HAVING AN EASILY ASSEMBLED FRAME HINGE JOINT

[75] Inventor: Walter Bauer, Munich, Fed. Rep. of Germany

[73] Assignee: Agfa-Gevaert AG, Leverkusen, Fed. Rep. of Germany

[21] Appl. No.: 816,818

[22] Filed: Jan. 3, 1992

[30] Foreign Application Priority Data

Feb. 6, 1991 [DE] Fed. Rep. of Germany ... 9101332[U]

[51] Int. Cl.$^5$ ............................................. G03B 42/04
[52] U.S. Cl. ..................................... 378/188; 378/182
[58] Field of Search ................................. 378/188, 182

[56] References Cited

U.S. PATENT DOCUMENTS 4,386,431  5/1983  Van Landeghem ................ 378/188
4,947,419  8/1990  Schmidt et al. .................... 378/188

Primary Examiner—Craig E. Church
Attorney, Agent, or Firm—Michael J. Striker

[57] ABSTRACT

The X-ray film cassette has an interior portion and two cassette sections pivotally connected with each other by the frame hinge joint. The two cassette sections have opposing small sides positioned remotely from the frame hinge joint lockable with each other at the opposing small sides. The frame hinge joint is a plastic member having opposing longitudinal sides, each of which is provided with a jaw-like groove. Each cassette section has a complementary projection and is lockable with one of the longitudinal sides by insertion of the complementary projection in the jaw-like groove. Reinforced side pieces (3e, 3f) of the plastic member (3) form the jaw-like grooves, a projecting nose (1b, 2b) is provided on each of the complementary projecting members (1a, 2a), and the plastic member (3) is provided with three recesses (3a, 3b) on a strip which connects the side pieces, which form three suitable bending lines for the frame hinge joint.

3 Claims, 1 Drawing Sheet

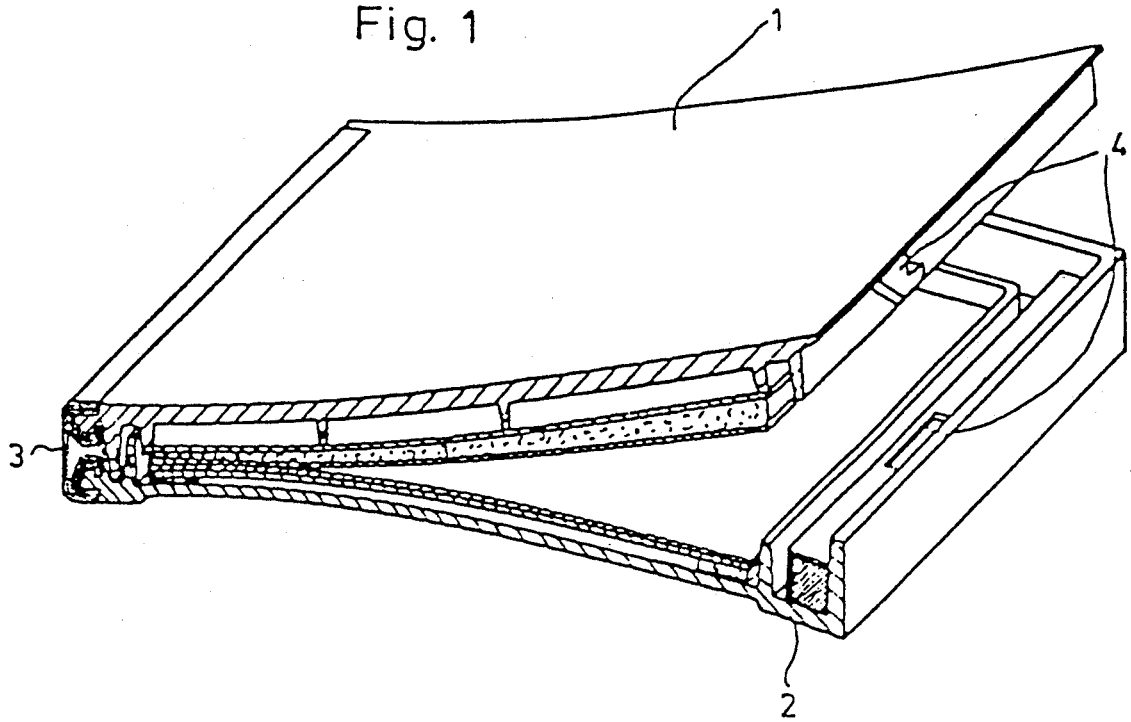
Fig. 1
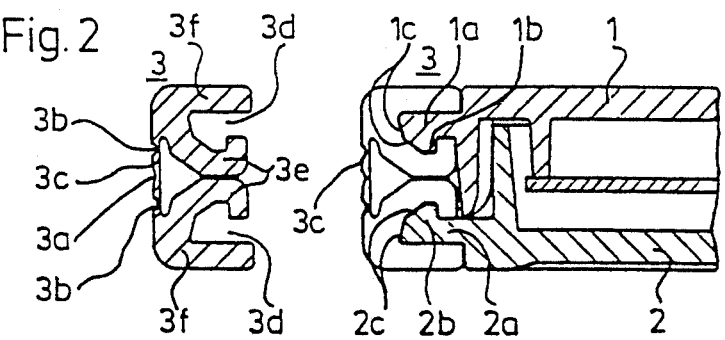
Fig. 2
Fig. 3
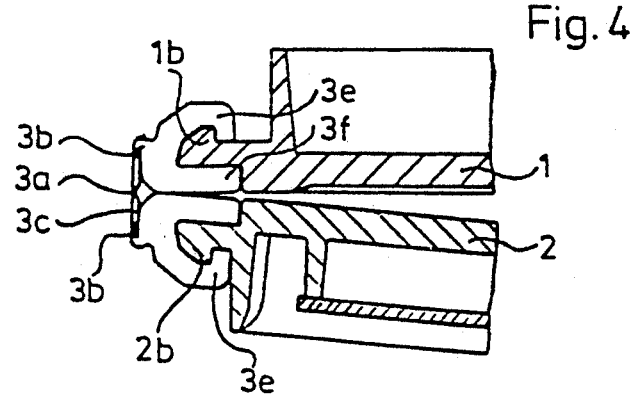
Fig. 4

X-RAY FILM CASSETTE HAVING AN EASILY ASSEMBLED FRAME HINGE JOINT

The present invention relates to a frame hinge joint for an X-Ray film cassette, which joins two sections of the film cassette with each other, and to the X-Ray film cassette having that frame hinge joint.

An X-Ray film cassette is known and described in German Patent 29 17 547. This X-Ray film cassette has two cassette sections pivotally connected with each other by a frame hinge joint. The two cassette sections have opposing small sides positioned remotely from the frame hinge joint and lockable with each other to close the cassette. This frame hinge joint comprises a plastic member having opposing longitudinal sides each of which is provided with a jaw-like groove, which is "T" shaped. The cassette sections have a complementary projection and are lockable with one of the longitudinal sides by insertion of the corresponding complementary projection in the jaw-like groove.

The "T"-shaped claw-like grooves, which are lockable with corresponding complementary projections of the sections forming the X-Ray film cassette, have the disadvantage that assembly of the frame hinge joint is difficult and the claw-like groove have the tendency with the cassette open to release the complementary projection, which it holds. An additional disadvantage of the known frame hinge joint is that it has no definite bending line and the resulting hinge has no well defined leverage.

SUMMARY OF THE INVENTION

It is an object of the present invention to provide a frame hinge joint which is easily assembled.

It is another object of the present invention to provide a frame hinge joint having definite bending lines, in which the complementary projections on the sections remain in fixed engagement with the claw-like groove with the X-Ray film cassette open.

These objects, and others which will become more apparent hereinafter, are attained in an X-Ray film cassette having two cassette sections pivotally connected with each other by a frame hinge joint, the two cassette sections having opposing small sides positioned remotely from the frame hinge joint and being lockable with each other at the small sides. The frame hinge joint comprises a plastic member having opposing longitudinal sides, each of the longitudinal sides being provided with a jaw-like groove and each of the cassette sections having a complementary projection and being lockable with one of the longitudinal sides by insertion of the complementary projection in the jaw-like groove.

According to the present invention, reinforced side pieces forming the jaw-like grooves are provided in the plastic member, a projecting nose is provided on each of the complementary projecting members, and the projecting noses are directed into the interior, when the cassette sections are locked together. Each of the noses is provide with an edge and the plastic member advantageously has a longitudinal strip connecting the side pieces, which is provided with three advantageously longitudinally extending recesses (3a, 3b) so as to form three suitable bending lines.

Advantageously the three recesses include one approximately centrally located on the strip and two others located at opposite sides of the strip.

BRIEF DESCRIPTION OF THE DRAWING

The objects, features and advantages of the present invention will now be illustrated in more detail by the following detailed description, reference being made to the accompanying drawing in which:

FIG. 1 is a partial cross-sectional, partially perspective view through an X-Ray film cassette having a frame hinge joint according to the invention;

FIG. 2 is a detailed cross-sectional view through a frame hinge joint according to the invention;

FIG. 3 is a detailed cross-sectional view of the frame hinge joint of FIG. 1; and FIG. 4 is an action view showing the frame hinge joint according to FIG. 3 open so that the cassette sections are pivoted about 180°.

DETAILED DESCRIPTION OF THE PREFERRED EMBODIMENTS

An X-Ray film cassette cover section 1, which forms the cover of the X-Ray film cassette, and a film cassette base section 2 are shown in FIG. 1. The cover section 1 and the base section 2 are lockable with each other at their respective small sides 4. The frame hinge joint, which is located on a small side of the cassette opposite to the small sides 4, includes a plastic member 3.

A cross-sectional view of the plastic member 3 comprising the frame hinge joint is shown in FIG. 2. The plastic member 3 has a jaw-like groove 3d extending along each of its longitudinal sides. The jaw-like groove 3d is formed by longitudinally extending side pieces 3e, 3f, which are reinforced. A strip 3c extends longitudinally connected to the first longitudinal side formed by the reinforced side pieces 3e, 3f and the second longitudinal side formed by the side pieces 3e, 3f. This strip 3c has one approximately centrally located recess 3a and two side recesses 3b and extend longitudinally on it. These recesses 3a, 3b define three bending lines, about which the cassette sections are pivoted on opening the cassettes.

Complementary projecting members 1a and/or 2a are shown in FIG. 3. The complementary projecting members 1a, 2 each have a projecting nose 1b, 2b in the vicinity of each edge 1c, 2c. These noses point into the interior of the cassette. During assembly of the frame hinge joint, the side pieces 3e of the jaw-like grooves 3d slide over the edges 1c and/or 2c, so that the assembly is considerably simplified. Up to now it has been necessary to push open the frame hinge joint, a considerably lengthy process.

The cover section 1 and the base section 2 are shown pivoted 180° in FIG. 4, in which the side pieces of the jaw-like grooves 3e, 3f are pivoted about the bending lines 3b defined by the recesses 3b.

If the the X-Ray film cassette is opened, and thus the cover section 1 and the base section 2 are unlocked and subsequently the cover section 1 is pivoted 180°, the cover section 1 is pivoted about the bending line defined by the recess 3a. Thus the relative motion of the cassette sections are defined relative to each other. If the cover section 1 pivots about an additional 180°, this occurs about both bending lines defined by the recesses. The force distribution in the frame hinge joint of the completely opened X-Ray film cassette is such that the side pieces 3e of the jaw-like grooves 3d are pressed against the noses 1b, 2b of the complementary projecting members 1a, 2a and thus the jaw-like groove remains fixed in engagement with the complementary projecting member. The tendency of the existing film cassettes for the jaw-like groove to release from the complementary projection does not exist in the structure according to the invention described herein. The structure of the frame hinge joint according to the invention also provide a stable X-Ray film cassette with definite face and motion relationships.

While the invention has been illustrated and described as embodied in a frame joint for an X-Ray film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In an X-Ray film cassette having an interior portion and two cassette sections pivotally connected with each other by a frame hinge joint, said two cassette sections having opposing small sides positioned remotely from the frame hinge joint and being lockable with each other at the opposing small sides, said frame hinge joint comprising a plastic member having opposing longitudinal sides, each of said longitudinal sides being provided with a jaw-like groove, each of said cassette sections having a complementary projection and being lockable with one of said longitudinal sides by insertion of said complementary projection in said jaw-like groove, the improvement comprising reinforced side pieces (3e, 3f) of the plastic member (3) forming the jaw-like grooves, a projecting nose (1b, 2b) provided on each of the complementary projecting members (1a, 2a), said projecting noses (1b, 2b) being directed into the interior portion when the cassette sections are locked together, and wherein each of the noses (1b, 2b) is provided with an edge (1c, 2c), and the plastic member (3) is provided with three recesses (3a, 3b) so as to form three suitable bending lines.

2. The improvement as defined in claim 1, wherein the hinge joint has a longitudinally extending strip connecting the side pieces and the three recesses (3a, 3b) extend longitudinally on the strip.

3. The improvement as defined in claim 2, wherein the three recesses include one approximately centrally located on said strip and two others located at the sides of said strip.

* * * * *